(12) United States Patent
Garg et al.

(10) Patent No.: US 11,516,163 B2
(45) Date of Patent: Nov. 29, 2022

(54) IMAGE-BASED COMMUNICATION AND RESPONSE SUGGESTIONS

(71) Applicant: T-Mobile USA, Inc., Bellevue, WA (US)

(72) Inventors: Parag Garg, Woodinville, WA (US); Nicholas LaVassar, Issaquah, WA (US); Christopher Painter, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/219,732

(22) Filed: Mar. 31, 2021

(65) Prior Publication Data

US 2022/0321514 A1   Oct. 6, 2022

(51) Int. Cl.
*G06F 15/16* (2006.01)
*H04L 51/18* (2022.01)
(Continued)

(52) U.S. Cl.
CPC .............. *H04L 51/18* (2013.01); *H04L 51/02* (2013.01); *H04L 51/066* (2013.01); *H04L 51/10* (2013.01); *H04L 51/216* (2022.05); *H04L 67/535* (2022.05)

(58) Field of Classification Search
CPC ......... H04L 51/18; H04L 51/10; H04L 51/02; H04L 51/066; H04L 51/16; H04L 67/22; H04L 51/216; H04L 67/535

(Continued)

(56) References Cited

U.S. PATENT DOCUMENTS 7,796,977 B2   9/2010   Veen
8,429,103 B1   4/2013   Aradhye et al.
(Continued)

FOREIGN PATENT DOCUMENTS

CN    101505321 A    8/2009

OTHER PUBLICATIONS

Bidasaria, Gaurav. 8 Best Polling Apps for Android and iOS Smartphones. TechWiser, Jun. 15, 2019 [online], [retrieved on Mar. 21, 2021] Retrieved from the Internet URL: https://techwiser.com/best-polling-apps/.

*Primary Examiner* — Johnny B Aguiar
(74) *Attorney, Agent, or Firm* — Han Santos, PLLC

(57) ABSTRACT

Methods, systems, and apparatus, including computer programs encoded on a computer storage medium, for implementing menu-based communication are disclosed. In one aspect, a method includes the actions of receiving, from a first computing device, a communication and data identifying a second computing device as a recipient of the communication. The actions may further include determining a first and second candidate response to the communication. The actions may further include providing, to the second computing device, the communication, the first and second candidate responses, and instructions to provide, for output by the second computing device, the first and second candidate responses as selectable responses to the communication. The actions may further include receiving, from the second computing device, the selection of the first or second candidate response. The actions may further include providing, for output to the first computing device, data indicating the selection of the first or second candidate response.

20 Claims, 5 Drawing Sheets

(51) Int. Cl.
  *H04L 51/10* (2022.01)
  *H04L 51/02* (2022.01)
  *H04L 51/066* (2022.01)
  *H04L 51/216* (2022.01)
  *H04L 67/50* (2022.01)

(58) Field of Classification Search
  USPC .......................................................... 709/206
  See application file for complete search history.

(56) References Cited

U.S. PATENT DOCUMENTS

| | | |
|---|---|---|
| 8,819,566 B2 | 8/2014 | Mehin et al. |
| 9,232,067 B2 | 1/2016 | Leigh et al. |
| 9,405,427 B2 | 8/2016 | Curtis et al. |
| 9,521,255 B1 | 12/2016 | Lavian et al. |
| 10,116,458 B2 | 10/2018 | Keiser et al. |
| 10,469,414 B2 | 11/2019 | Scott |
| 2010/0285775 A1* | 11/2010 | Klein ..................... H04L 51/18 455/411 |
| 2011/0202879 A1 | 8/2011 | Stovicek et al. |
| 2013/0104246 A1 | 4/2013 | Bear et al. |
| 2016/0037311 A1* | 2/2016 | Cho ........................ H04W 4/12 455/466 |
| 2016/0283447 A1* | 9/2016 | Masterson ............ G06F 3/0484 |
| 2017/0195269 A1* | 7/2017 | Miklos .................. G06N 20/00 |
| 2017/0201471 A1* | 7/2017 | Miklos .................. G06Q 10/00 |
| 2018/0083898 A1* | 3/2018 | Pham .................. G06F 3/04842 |
| 2018/0083901 A1* | 3/2018 | Mcgregor, Jr. ........ G06K 9/726 |
| 2018/0189628 A1* | 7/2018 | Kaufmann ............. H04L 51/36 |
| 2018/0196796 A1* | 7/2018 | Wu ....................... G06N 5/022 |
| 2018/0239770 A1* | 8/2018 | Ghotbi ................... G06F 9/453 |
| 2019/0333020 A1* | 10/2019 | Zhao ...................... H04L 51/02 |
| 2020/0044990 A1* | 2/2020 | Zhao ....................... G06N 7/00 |
| 2020/0293562 A1* | 9/2020 | Pasternack ............ G06Q 50/01 |

\* cited by examiner

IMAGE-BASED COMMUNICATION AND RESPONSE SUGGESTIONS

BACKGROUND

Messaging is the act of composing and sending electronic messages between two or more users of computing devices. Text messages may be sent over a cellular network or may also be sent via a network connection over Wi-Fi, cellular radio, short-range radio, or other similar connection. The text messages may include images, videos, audio, and/or emojis. In some instances, the images, videos, audio, and/or emojis may replace the text.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Parents are frequently making the decision to provide their children with devices in order to communicate with them in various situations. Communicating with a child who is able to read and type on a device may be straight forward. However, when the child is still learning to read and write, communicating through devices may be difficult. Communicating can be even more of a challenge when the child's device has a small interface, as may be the case with a watch.

To assist a parent in communicating with a child, the parent's device may be configured to identify input where the parent is requesting a response from the child. For example, the device may identify an input that corresponds to, "What would you like for dinner?" The device may determine that this input is a question and prompt the parent for appropriate responses or automatically generate appropriate responses based on previous conversations and other factors. Those responses may include, "pizza," "macaroni and cheese," and "chicken nuggets." The child's device may receive the parent's communication and responses and present the communication in a way that assists the child in comprehending and responding to the communication. The child's device may access pictures that represent each of the responses and present those pictures as the possible responses. In this way, the child may read or hear the question, "What would you like for dinner?" and respond by selecting from pictures of pizza, macaroni and cheese, and chicken nuggets. The child's device may generate a communication based on the child's selection and transmit that communicate to the parent's device. If the child selects the pizza picture, then the parent may see the text "pizza" on the parent's device.

In some implementations, the child's device may be configured to determine a technique for presenting a communication to the child in way that improves the likelihood that the child is able to understand and/or respond to the communication. The child's device may analyze previous communications involving the child's device, the child's previous interactions with the child's device, the child's previous interactions with other devices, the current communication, and/or other factors. Based on those factors, the child's device may determine how to present the current communication to the child. Some presentation techniques may include converting the reply options to pictures and allowing the child to select a picture by touch or speech, outputting audio representations of the reply options, allowing the child to reply by selecting from various emojis, and/or other techniques.

Figure 1:
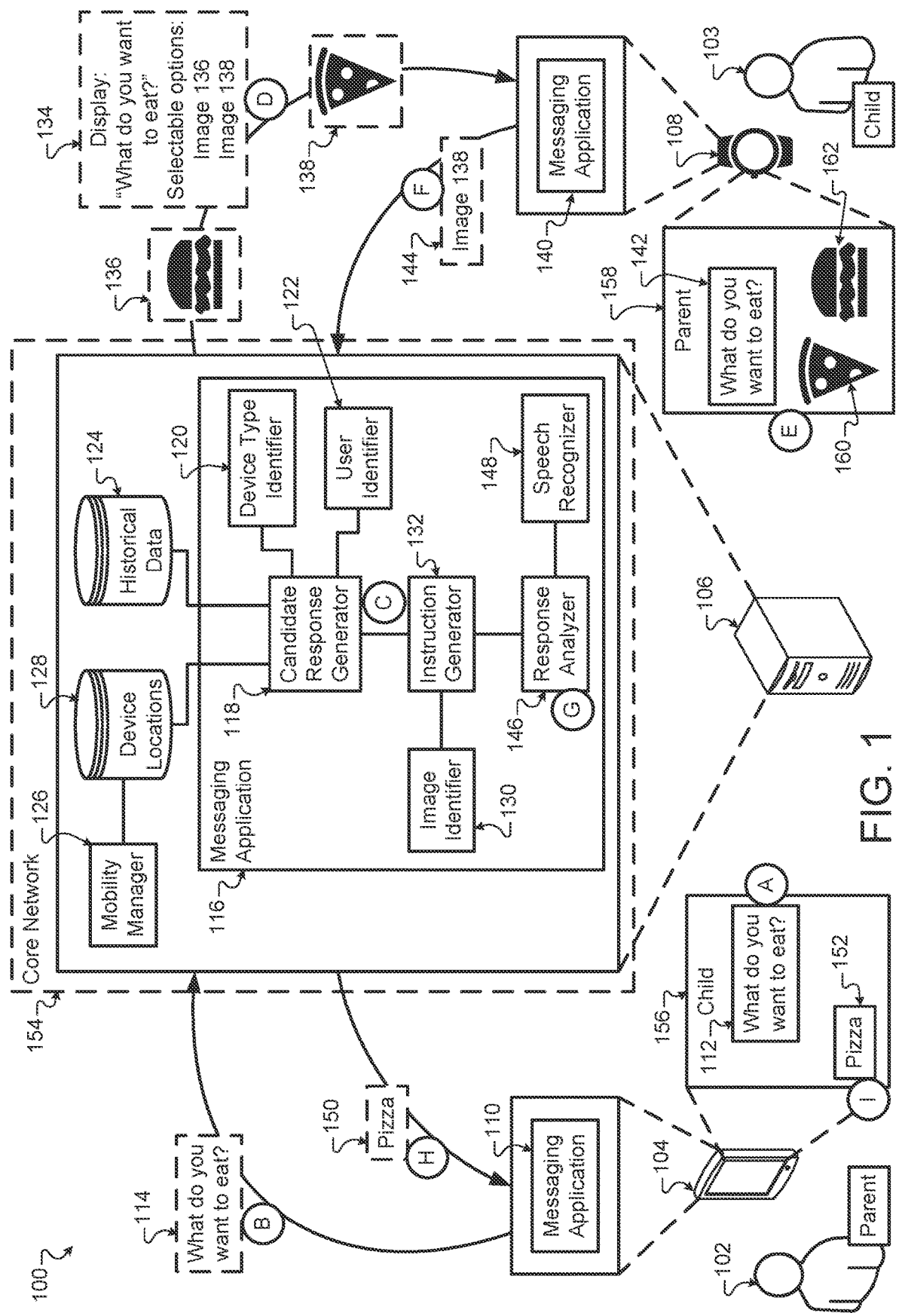
FIG. 1 illustrates an example system that is configured to provide menu-based communication between users through a messaging application.

FIG. 1 illustrates an example system 100 that is configured to provide menu-based communication between users 102 and 104 through a messaging application. Briefly, and as described in more detail below, the system 100 includes a server 106 that is configured to facilitate menu-based communication between the computing device 104 of user 102 and the computing device 108 of user 103. The server 106 may receive a communication 114 from the computing device 104 and identify images that corresponding to candidate responses to the communication 114. The server 106 may provide instructions 134 to the computing device 108 to output data based on the communication 114 and the images that correspond to the candidate responses. The user 103 selects a candidate response, and the server 106 provides data indicating the selection of the candidate response to the computing device 104. FIG. 1 includes various stages A through I that may illustrate the performance of actions and/or the movement of data between various components of the server 106 and/or between the server 106 and the computing devices 104 and 108. The system 100 may perform these stages in any order.

In more detail, the user 102 may be a parent who is attempting to communicate with the user 103 who may be the parent's child. The user 102 may be using the computing device 104 that may be a mobile phone, tablet, laptop computer, desktop computer, smart watch, or any other similar device. The user 103 may be using the computing device 108 that may be a device that is designed for a child, such as a child's smart watch, mobile phone, tablet, gaming device, or any other similar device. The computing device 108 may have limited functionality compared to the computing device 104. For example, the computing device 108 may be able to place telephone calls to contacts in the contacts of the computing device 108. The contacts of the computing device 108 may be managed through other computing devices such as the computing device 104. In some instances, the computing device 108 may make it easier to communicate with other computing devices even if the user 103 is in the process of learning to read and/or type. For example, the computing device 108 may display images that the user 103 can select to respond to a communication.

In the example of FIG. 1, the user 102 may be attempting to ask the user 103 what the user 103 would like to eat. Because the user 104 may still be learning to type and/or to encourage the user 103 to respond, the computing device 108 may present an image 136 of a hamburger and an image 138 of pizza on the computing device 108. The user 103 may choose hamburgers by selecting the image 136 or pizza by selecting the image 138. Depending on the selection of the user 103, the computing device 104 may display a message that corresponds to the selection by the user 103.

The computing device 104 may include a messaging application 110. The messaging application 110 may be configured to conduct text-based conversations with other users. In some instances, the messaging application 110 may be configured to exchange images, videos, and audio clips with other computing devices. In some instances, the messaging application 110 may exchange short messaging service communications and/or multimedia messaging service communications with other computing devices. In some instances, the messaging application 110 may be configured to perform speech recognition on the speech of the user 102. The message application 110 may transmit a transcription of the speech with or without the speech audio.

In stage A, the user 102 may be communicating with the user 103. The messaging application 110 may display an interface 156 that includes communications inputted by the user 102 on the right side of the interface 156 and communications received from the user 103 on the left side of the interface 156. The user 102 may provide the communication 114 to the computing device 104. The user 102 may type the communication 114, speak the communication 114, or use any other similar type of input method. For example, the user 102 may type, "What do you want to eat?" The messaging application 110 may update the interface 156 to include the text bubble 112 that includes the text "What do you want to eat?"

In stage B, the messaging application 110 may transmit the communication 114 to the server 106. The communication 114 may include the message "What do you want to eat?" in addition to data identifying the recipient of the communication 114, such as the user 103. The server 106 may include a messaging application 116 that receives the communication 114, processes the communication 114, and transmits instructions 134 to the computing device 108 related to displaying the communication 114. The messaging application 116 of the server 106 may be configured to receive a response 144 from the computing device 108, process the response 144, and transmit response data 150 to the computing device 104.

The server 106 may be included in or in communication with a network such as a wireless carrier network that provides voice and data communication services to multiple devices, such as the computing devices 104 and 108 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104 and 108 and other devices using a Wi-Fi network, short range radio, infrared communication, and/or any other similar communication technique.

The wireless carrier network may include a radio access network and a core network 154. The radio access network may include multiple base stations. The multiple base stations are responsible for handling voice and/or data traffic between multiple devices, such as the com computing devices 104 and 108 and other devices and the core network 154. Accordingly, each of the base stations may provide a corresponding network cell that delivers telecommunication and data communication coverage. The core network 154 may use the network cells to provide communication services to the multiple subscriber devices. For example, the core network 154 may connect the multiple devices to other telecommunication and data communication networks, such as the Internet and the public switched telephone network (PSTN). The base stations are responsible handling voice and data traffic between devices and the core network 154. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The messaging application 110 may include a candidate response generator 118. The candidate response generator 118 may be configured to analyze the communication 114 and determine candidate responses to the communication 114. The candidate response generator 118 may use various factors to determine the candidate responses to the communication 114. For example, the candidate response generator 118 may analyze the location of the computing devices 104 and/or 108, the device type of the computing device 104 and/or 108, an identity of the users 102 and/or 104, previous communications between the user 102 and the user 103, and/or any other similar factors. The candidate response generator 118 may analyze the factors using rules and/or models that specify candidate responses to the communication 114 based on the various factors. For example, the candidate response generator 118 may determine not to generate candidate responses to the communication 114. As another example, the candidate response generator 118 may determine textual candidate responses to the communication 114. As another example, the candidate response generator 118 may determine images that are candidate response to the communication 114. As another example, the candidate response generator 118 may determine audio or video clips that are candidate responses to the communication 114.

One of the factors that the candidate response generator 118 may use to determine the candidate responses to the communication 114 may include the location of the computing devices 104 and/or 108. The candidate response generator 118 may access the device locations 128. The device locations 128 may include data identifying the current and previous locations of the computing devices 104 and/or 108 and other computing devices communicating with the server 106. The server 106 may include a mobility manager 126 that determines and stores location data in the device locations 128. The mobility manager 126 may be configured to monitor the location of computing devices 104 and 108 that are connected to the server 106 through a wireless base station. The location of the computing devices 104 and 108 may include the location of the wireless base station to which the computing devices 104 and 108 are connected and/or global positioning system (GPS) data received from the computing devices 104 and 108.

In some implementations, the mobility manager 126 may determine the location of computing devices 104 and 108 at periodic intervals, such as every five seconds. In some implementations, the mobility manager 126 may determine the location of computing devices 104 and 108 when the computing devices 104 and 108 connect to a different wireless base station and/or provide updated GPS data. In some implementations, the mobility manager 126 may determine the location of the computing devices 104 and 108 relative to the base station with which the computing device is communicating. In this case, the mobility manager 126 may determine the relative location based on data collected from the base station such as signal strength and direction of communications between the computing devices 104 and 108 and the base station. The mobility manager 126 may also determine the relative location based on the location of the base station and GPS data received from the computing devices 104 and 108. The relative location data may include a distance between the computing devices 104 and 108 and the base station, the cardinal direction from the base station to the computing devices 104 and 108, and/or any other similar measurements.

Another factor that the candidate response generator 118 may use to determine the candidate responses to the communication 114 may include the device type of the computing devices 104 and/or 108. The server 106 may include a device type identifier 120. The device type identifier 120 may be configured to identify a type of device that transmitted the communication 114 and a type of device that is to receive data based on the communication 114. In some instances, the computing devices 104 and/or 108 may be associated with a phone number. In this case, the device type identifier 120 may access data that relates phones number to the type of equipment associated with that phone number. In some instances, the computing devices 104 and/or 108 may be associated with a unique identifier such as an international mobile subscriber identity, media access control address, and/or another similar identifier. In this case the device type identifier 120 may access data that relates the unique identifier to the type of equipment associated with that identifier. The device type identifier 120 may provide data identifying the device types of the computing devices 104 and/or 108 to the candidate response generator 118.

In the example of FIG. 1, the device type identifier 120 may determine that the computing device 104 is a mobile phone, model 8B, manufactured by Acme Phone Company. The device type identifier 120 may provide this device type data to the candidate response generator 118. The device type identifier 120 may determine that the computing device 108 is a child's smart watch, model 4A, manufactured by Acme Watch Company. The device type identifier 120 may provide this device type data to the candidate response generator 118.

Another factor that the candidate response generator 118 may use to determine the candidate responses to the communication 114 may include the identity of the users 102 and/or 104. The server 106 may include a user identifier 122. The user identifier 122 may be configured to determine the identity of the users 102 and/or 104 and provide the identity data to the candidate response generator 118. In some instances, the computing devices 104 and/or 108 may be associated with a particular user. Each user may be associated with various demographic data such as age, gender, and/or other demographic information. The user identifier 122 may provide identity data and/or demographic data to the candidate response generator 118 based on the user data associated with the computing devices 104 and/or 108. In some instances, the user identifier 122 may provide data classifying the users 102 and/or 104. For example, the user identifier 122 may provide an age range of the users 102 and/or 104 to the candidate response generator 118. In some implementations, the user identifier 122 may provide data indicating whether the computing devices 104 and/or 108 are included in the same account with the wireless carrier, as may be the case for the computing devices of each person who are part of the same household.

In the example of FIG. 1, the user identifier 122 may determine that the age of the user 103 is between five and eight years old. The user identifier 122 may provide this data to the candidate response generator 118. The user identifier may determine that the age of the user 102 is between thirty and forty years old. The user identifier 122 may provide this data to the candidate response generator 118. In some instances, the user identifier 122 may provide data indicating that the computing devices 104 and 108 are included in the same account with the wireless carrier.

Another factor that the candidate response generator 118 may use to determine the candidate responses to the communication 114 may include previous communications between the user 102 and the user 103 and/or the communications between the computing device 104 and the computing device 108. The candidate response generator 118 may access the historical data 124. The historical data 124 may include data related to the actions, communications, and/or movements of the computing devices 104 and 108 and other computing devices communicating with the server 106. In some implementations, the historical data 124 may include data related to the actions, communications, and/or movements of the users 102 and 103 interacting with the computing devices 104 and 108 and other computing devices communicating with the server 106. For example, the historical data 124 may include transcriptions of previous communications between the user 102 and the user 103. The transcriptions may be based on communications using the messaging applications 110, 116, and 140 and other text-based communication applications that transmit data through the server 106.

In stage C, the candidate response generator 118 may receive device type data from the device type identifier 120 that identifies the computing devices 104 and 108 and identity data from the user identifier 122 that identifies the users 102 and 104. Based on the device type data and the identity data, the candidate response generator 118 may access location data from the device locations 128 and previous communication data from the historical data 124. In instances where the current conversation includes previous portions, the previous communication data may also include those previous portions. The candidate response generator 118 may analyze the communication 114, device type data, the identity data, the location data, and/or the previous communication data using one or more rules and/or models that are configured to generate candidate responses to the communication 114.

The models may include machine learning models that are trained using the historical data 124. The models may be configured to receive the communication 114, the device type data, the identity data, the location data, and/or the previous communication data and output one or more candidate responses to the communication 114. Different models may be configured to receive different inputs. For example, a first model may be configured to receive the communication 114, device type data, and the identity data. A second model may be configured to receive the communication 114, the identity data, and the location data. Both the first and the second models may be configured to output one or more candidate responses to the communication 114. The rules may specify how to compare the communication 114, the device type data, the identity data, the location data, and/or the previous communication data to generate a candidate response. Some rules may specify how to compare a subset of those factors. For example, a rule may specify how to compare the communication 114, the device type data, and the identity data. Another rule may specify how to compare the communication 114, the device type data, and the previous communication data.

In the example of FIG. 1, the candidate response generator 118 may use the rules and/or models to analyze the communication 114, the device type data, the identity data, the location data, and/or the previous communication data. The device type data may indicate that the computing device 104 is a mobile phone, and the computing device 108 is a child's smart watch. The identity data may indicate that the user 103 is between five and eight years old, and the user 102 is between thirty and forty years old. The identity data may indicate that the computing device 104 and the computing device 108 are on the same account of the wireless carrier. The location data may indicate that the computing device 104 is at the home of the user 102, and the computing device 108 is five miles away. The previous communication data may include data related to previous conversations related to food. The candidate response generator 118 may access a rule that indicates to select foods mentioned in previous conversations when the two users are discussing what to eat. Based on that rule and the factors, the candidate response generator 118 may determine that "pizza" and "hamburgers" are the candidate responses.

The candidate response generator 118 may provide the candidate responses to the instruction generator 132. The messaging application 116 may include the instruction generator 132 to determine an appropriate technique to use to display the communication 114 and the candidate responses on the computing device 108. The instruction generator 132 may also be configured to generate the instructions 134 for the computing device 108 for how to display the communication 114 and the candidate responses. The instruction generator 132 may analyze the communication 114, the candidate responses, the device type data, the identity data, the previous communication data, and/or the location data to determine how to display the communication 114 and the candidate responses. The instruction generator 132 may use one or more rules that specify how to compare the communication 114, the candidate responses, the device type data, the identity data, the previous communication data, and/or the location data to determine the display technique. For example, a rule may specify to display images for the candidate responses when the user 103 is under the age of eight. Another rule may specify to display images for the candidate responses when the computing device 108 has a screen that is smaller than three inches. Another rule may specify to make the candidate responses selectable when displaying images on the computing device 108.

In the example of FIG. 1, the instruction generator 132 may determine to display images of the candidate responses of "pizza" and "hamburgers" on the computing device 108. This determination may be based on a rule that specifies to display images for the candidate responses when the user 103 is under the age of eight and when the computing device 108 has a screen that is smaller than three inches. In this example, the user 103 is between the ages of five and eight and the computing device 108 has a 1.5 inch screen.

The instruction generator 132 may access an image identifier 130 to identify images for the candidate responses. The image identifier 130 may be included in the messaging application 116. The image identifier 130 may be configured to perform an image search for each of the candidate responses to identify an image that represents the candidate response. In some instances, the image identifier 130 may submit the text of the candidate response to a search engine. The image identifier 130 may select the top image that the search engine identified. In some implementations, the image identifier 130 may store image data of previously used or common images and the corresponding responses. In this case, the image identifier 130 may determine if the image identifier 130 has an image that corresponds to the candidate response before accessing the search engine.

In stage D and with the images identified, the instruction generator 132 may generate the instructions 134 and transmit the instructions 134, the image 136, and the image 138 to the computing device 108. The instructions 134 may be based on the technique for displaying the communication 114 and the candidate responses. For example, the instructions 134 may indicate to display the communication 114, "What do you want to eat?" and to display two images as selectable responses. The instructions 134 may reference the images 136 and 138, and the instruction generator 132 may provide the images 136 and 138 to the computing device 108.

The computing device 108 may include a messaging application 140 that may be configured to conduct text-based conversations with other users. In some instances, the messaging application 140 may be configured to exchange images, videos, and audio clips with other computing devices. In some instances, the messaging application 140 may exchange short messaging service communications and/or multimedia messaging service communications with other computing devices. In some instances, the messaging application 140 may be configured to perform speech recognition on the speech of the user 103. The message application 140 may transmit a transcription of the speech with or without the speech audio. In some instances, the messaging application 140 may be configured to receive the instructions 134 from the server 106 and display a communication according to the instructions 134.

In stage E, the messaging application 140 of the computing device 108 receives the instructions 134 and the images 136 and 138 from the server 106. The messaging application 140 processes the instructions 134 and displays, on a screen of the computing device 108, the interface 158 according to the instructions 134. For example, the interface 158 may include a text bubble 142 that includes the text of the communication 114. The interface 158 may also include the images 136 and 138.

In some implementations, the screen of the computing device 108 may be a touchscreen. In this case, the messaging application 140 may include the images 136 and 138 as selectable images that the user 103 can select to respond to the communication. In some implementations, the computing device 108 may include a microphone that detects audio of the user 103 speaking a response to the text bubble 142 that includes the text of the communication 114. In some implementations, the interface 158 may include a keyboard where the user 103 can type a response to the text bubble 142. In some implementations, the screen of the computing device 108 may not be large enough for the interface 158. In this case, the messaging application 140 may display a portion of the interface 158, such as the text bubble 142. The portion of the interface 158 may include an indication to swipe to display the remaining information. In this case, the remaining information may include the buttons 160 and 162.

In the example of FIG. 1, the messaging application 140 receives the instructions 134 that includes the communication "What do you want to eat?" and the images 136 and 138 of a hamburger and pizza, respectively. The instructions 134 also specify to display the image 136 and the image 138 as selectable options. The messaging application 140 generates the interface 158 according to the instructions 134. The interface 158 includes the text bubble 142 that includes the text "What do you want to eat?". The interface 158 also includes the button 160 that includes the image 138 of the pizza and the button 162 that includes the image 136 of the hamburger. Both the button 160 and the button 162 are selectable by the user 103. The messaging application 140 may interpret selection of either button 160 or 162 as a response to the text bubble 142.

In stage F, the user 144 selects the button 160 of the pizza image 138. The messaging application 140 detects the selection and generates response data 144 indicating the selection. In some implementations, the messaging application 140 may update the interface 158 to indicate that the user 103 selected the button 160. For example, the messaging application 140 may remove the button 162 and the hamburger image 136 from the interface 158. The messaging application 140 may add a new text bubble to the interface 158 that includes the image of the selected option. For example, the messaging application 140 may remove the image 136 and display the image 138 on the interface 158. In some instances, the user 103 may have to transition between interfaces to view the text bubble 142 and the new text bubble with the image 138.

The messaging application 116 may include a response analyzer 146 that is configured to analyze the response data 144 and generate response data 150 based on the response data 144. In stage G, the response analyzer 146 may compare the response data 144 to the instructions 134 and any included images, such as images 136 and 138. The response data 144 may not include the images 136 or 138. Instead, the response data 144 includes a reference to the images 136 or 138. For example, the response data 144 may include a reference to the image 138. The response analyzer 146 may determine that the reference to the image 138 corresponds to the candidate response "pizza" of the image 138. The response analyzer 146 may generate the response data 150 that includes the text "pizza." In stage H, the response analyzer 146 may provide the response data 150 to the messaging application 110 of the computing device 104.

In some implementations, the response data 144 may include audio data of the user 103 verbally selecting an option from the interface 142. In this case, the response analyzer 146 may access a speech recognizer 148. The speech recognizer 148 may be configured to generate a transcription of the audio by using a combination of language models and acoustic models. The speech recognizer 148 may provide the transcription of the audio to the response analyzer 146, and the response analyzer 146 may compare the transcription to the candidate responses. If the response analyzer 146 determines that the transcription is similar to one of the candidate responses, then the response analyzer 146 may generate the response data 150 that includes the text that matches the candidate response. If the response analyzer 146 determines that the transcription is not similar to one of the candidate responses, then the response analyzer 146 may generate the response data 150 that includes the transcription of the audio. In some implementations, the response analyzer 146 may include the audio in the response data 150.

In stage I, the messaging application 110 of the computing device 104 receives the response data 150. The messaging application 110 may update the interface 156 to include a text bubble 152 that includes the text included in the response data 150. In instances where response data 150 includes audio data of speech of the user 103, the messaging application 110 may include, on the interface 156, a button to play the audio data.

The conversation between the user 102 and the user 103 may continue. In this case, the part of the conversation highlighted by stages A through I will be included in the historical data 124. The candidate response generator 118 may use the new data of the historical data 124 to determine any additional candidate responses.

Figure 2:
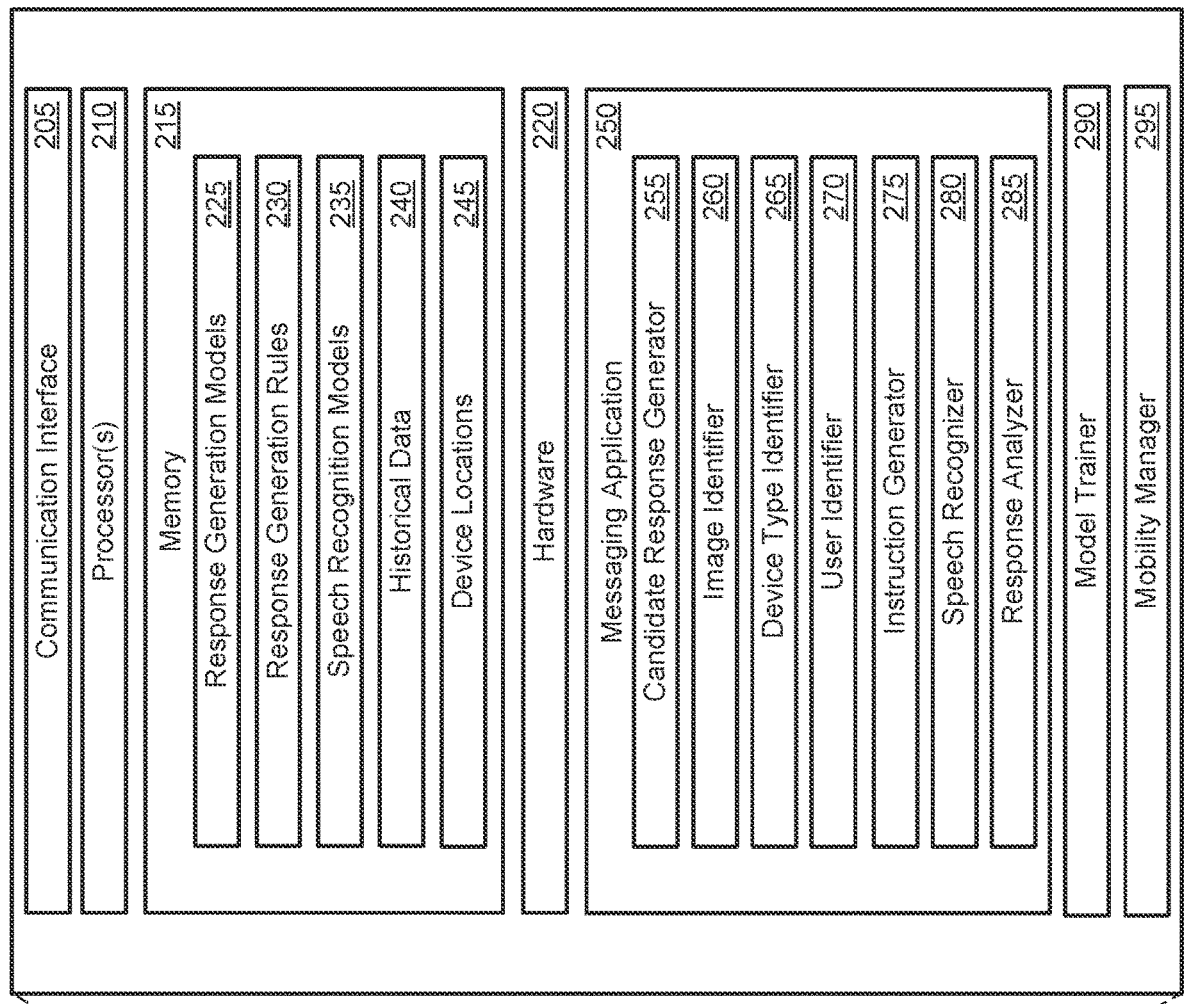
FIG. 2 illustrates an example server that is configured to provide menu-based communication between users through a messaging application.

FIG. 2 illustrates an example server 200 that is configured to provide menu-based communication between users through a messaging application. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a messaging application 250. The messaging application 250 may be similar to the messaging application 116 of FIG. 1. The messaging application 250 may be configured to configured to conduct text-based conversations with other users. In some instances, the messaging application 250 may be configured to facilitate the exchange of images, videos, and audio clips between computing devices. In some instances, the messaging application 250 may facilitate the exchange of short messaging service communications and/or multimedia messaging service communications with between computing devices. In some instances, the messaging application 250 may be configured to perform speech recognition on the speech audio received from a computing device. The message application 250 may transmit a transcription of the audio to a receiving computing device and include or not include the audio.

The messaging application 250 may include a candidate response generator 255. The candidate response generator 255 may be similar to the candidate response generator 118 of FIG. 1 and may be implemented by the one or more processors 210. The candidate response generator 255 may be configured to analyze a communication and determine candidate responses to the communication. The communication may be between two computing devices. The candidate response generator 255 may use various factors to determine the candidate responses to the communication. For example, the candidate response generator 255 may analyze the location of the computing devices, the device type of the computing devices, an identity of the users of the computing devices, previous communications between the users, and/or any other similar factors. The candidate response generator 255 may analyze the factors using the response generation models 225 and/or the response generation rules 230 that specify candidate responses to the communication based on the various factors. For example, the candidate response generator 255 may determine not to generate candidate responses to the communication. As another example, the candidate response generator 255 may determine textual candidate responses to the communication. As another example, the candidate response generator 255 may determine images that are candidate response to the communication. As another example, the candidate response generator 255 may determine audio or video clips that are candidate response to the communication.

The messaging application 250 may include a device type identifier 265. The device type identifier 265 may be similar to the device type identifier 120 of FIG. 1 and may be implemented by the one or more processors 210. The device type identifier 265 may be configured to identify a type of device that transmitted the communication and a type of device that is to receive data based on the communication. In some instances, the computing devices may be associated with a phone number. In this case, the device type identifier 265 may access data that relates phones number to the type of equipment associated with that phone number. In some instances, the computing devices may be associated with a unique identifier such as an international mobile subscriber identity, media access control address, and/or another similar identifier. In this case the device type identifier 265 may access data that relates the unique identifier to the type of equipment associated with that identifier. The device type identifier 265 may provide data identifying the device types of the computing devices to the candidate response generator 255.

The messaging application 250 may include a user identifier 270. The device user identifier 270 may be similar to the user identifier 122 of FIG. 1 and may be implemented by the one or more processors 210. The user identifier 270 may be configured to determine the identity of the users and provide the identity data to the candidate response generator 255. In some instances, the computing devices may be associated with a particular user. Each user may be associated with various demographic data such as age, gender, and/or other demographic information. The user identifier 270 may provide identity data and/or demographic data to the candidate response generator 255 based on the user data associated with the computing devices. In some instances, the user identifier 270 may provide data classifying the users. For example, the user identifier 270 may provide an age range of the users to the candidate response generator 255. In some implementations, the user identifier 270 may provide data indicating whether the computing devices are included in the same account with the wireless carrier, as may be the case for the computing devices of each person who are part of the same household.

The one or more processors 210 may implement a mobility manager 295. The mobility manager 295 may be similar to the mobility manager 126 of FIG. 1. The mobility manager 295 may be configured to monitor the location of a computing device that is connected to the server 200 through a wireless base station. The location of the computing device may include the location of the wireless base station to which the computing device is connected and/or GPS data received from the computing device. The mobility manager 295 may store the location data in the device locations 245 of the server 200.

In some implementations, the mobility manager 295 may determine the location of a computing device at periodic intervals, such as every five seconds. In some implementations, the mobility manager 295 may determine the location of a computing device when the computing device connects to a different wireless base station and/or provides updated GPS data. In some implementations, the mobility manager 295 may determine the location of the computing device relative to the base station with which the computing device is communicating. In this case, the mobility manager 295 may determine the relative location based on data collected from the base station such as signal strength and direction of communications between the computing device and the base station. The mobility manager 295 may also determine the relative location based on the location of the base station and GPS data received from the computing device. The relative location data may include a distance between the computing device and the base station, the cardinal direction from the base station to the subscriber device, and/or any other similar measurements.

The candidate response generator 255 may receive the device type data from the device type identifier 265 and the identity data from the user identifier 270. Based on the device type data and the identity data, the candidate response generator 255 may access location data from the device locations 245 and previous communication data from the historical data 240. In instances where the current conversation includes previous portions, the previous communication data may also include those previous portions. The candidate response generator 255 may analyze the communication, device type data, the identity data, the location data, and/or the previous communication data using the response generation rules 230 and/or the response generation models 225 that are configured to generate candidate responses to the communication.

The one or more processors 210 may implement a model trainer 290. The mobility manager 295 may be similar to the mobility manager 126 of FIG. 1. The model trainer 290 may be configured to train the response generation models 225 using machine learning and the historical data 240 and generate the response generation rules 230 by identifying patterns and trends in the historical data 240. To train the response generation models 225, the model trainer 290 may generate data samples using the historical data 240. The historical data 240 may include data related to the actions, communications, and/or movements of computing devices communicating through the server 106. In some implementations, the historical data 240 may include data related to the actions, communications, and/or movements of the users interacting with the computing devices. For example, the historical data 240 may include transcriptions of previous communications between users. The transcriptions may be based on communications using the messaging application 250 and other text-based communication applications that facilitate the exchange of data between computing devices through the server 106.

The model trainer 290 may generate the data samples by grouping the historical data 240 into consecutive portions of conversations provided by different users. The data sample may also include data identifying the type of device used by each of the users, the identity of each user, the location of each user, previous portions of that same conversation, and/or data from previous conversations. The model trainer 290 may generate a data sample from a conversation by selecting a portion of the conversation provided by a first user and selecting the subsequent portion of the conversation provided by a second user. The model trainer 290 may also include in the data sample the type of devices used by the first and second users, the identities of the first and second users, the locations of the first and second users, previous portions of that same conversation between the first and second users, data from previous conversations between the first and second users, and data from previous conversations between the first user and other users and between the second user and other users. In some instances, some items of this data may be unavailable to the model trainer 240. For example, if the first user is a parent and the second user is child, then there may not be data from previous conversations between the second user and other users may be limited. In this case, the model trainer 290 may use the historical data 240 to generate a threshold number of data samples without the data from previous conversations between the second user and other users.

The model trainer 290 may train a response generation model using machine learning and the data samples. The trained response generation model may be configured to receive data similar to the data samples and output candidate responses to a portion of a conversation. For example, if the data samples included type of device used by each of the users, the identity of each user, and consecutive portions of a conversation provided by each user, then the trained model may be configured to receive data identifying the type of device used by each user, the identity of each user, and a portion of the conversation provided by a user. The model may output candidate response to the portion of the conversation. In some implementations, the model may provide a confidence score for each of the candidate responses. The candidate response generator 255 may select the candidate responses that satisfy a confidence score threshold or select a particular number of candidate responses that have the highest confidence scores.

In some implementations, the model trainer 290 may train response generation models 225 for use during conversations between specific users. For example, the model trainer may train a different model for use between a first and second user and between the second user and the third user. Whether the model trainer 290 trains response generation models 225 specific for pairs of users may depend on whether the historical data 240 includes data from previous conversations between specific users and whether the model trainer 290 includes that data in the data samples. In order to preserve computing resources, the model trainer 290 may not include data from previous conversations between specific users in the data samples. In this case, the candidate response generator 255 may use the same response generation model for different users.

The model trainer 290 may be configured to generate the response generation rules 230 by identifying patterns and trends in the historical data 240. Based on those patterns and trends, the model trainer 290 may generate response generation rules that specify candidate response if certain conditions are met for the current conversation between users, the type of device used by each of user, the identity of each user, the location of each user, previous portions of that same conversation, and/or data from previous conversations. For example, the model trainer 290 may analyze conversations between parents. The model trainer 290 may identify foods that the parents feed their children. The model trainer 290 may generate a rule that specifies to suggest those foods as candidate responses when discussing food for either specifically those parents or for any parent discussing food for children.

The candidate response generator 255 may generate the candidate responses using the response generation models 225 and/or the response generation rules 230 to analyze the communication from a user and any additional data. The candidate response generator 255 may provide the candidate responses to the instruction generator 275. The messaging application 250 may include the instruction generator 275 and the one or more processors 210 may implement the instruction generator 275. The instruction generator 275 may be similar to the instruction generator 132 of FIG. 1. The instruction generator 275 may be configured to determine an appropriate technique to use to display the communication and the candidate responses on a receiving computing device. The instruction generator 275 may also be configured to generate instructions for the receiving computing device for how to display the communication and the candidate responses. The instruction generator 275 may analyze the communication, the candidate responses, the device type data, the identity data, the previous communication data, and/or the location data to determine how to display the communication and the candidate responses. The instruction generator 275 may use one or more rules that specify how to compare the communication, the candidate responses, the device type data, the identity data, the previous communication data, and/or the location data to determine the display technique. For example, a rule may specify to display images for the candidate responses when the user is under the age of eight. Another rule may specify to display images for the candidate responses when the computing device has a screen that is smaller than three inches. Another rule may specify to make the candidate responses selectable when displaying images on the computing device.

The instruction generator 275 may access an image identifier 260 to identify images for the candidate responses. The image identifier 260 may be included in the messaging application 250 and may be implemented by the one or more processors 210. The image identifier 260 may be similar to the image identifier 130 of FIG. 1. The image identifier 260 may be configured to perform an image search for each of the candidate responses to identify an image that represents the candidate response. In some instances, the image identifier 260 may submit the text of the candidate response to a search engine. The image identifier 260 may select the top image that the search engine identified. In some implementations, the image identifier 260 may store image data of previously used or common images and the corresponding responses. In this case, the image identifier 260 may determine if the image identifier 260 has an image that corresponds to the candidate response before accessing the search engine.

The messaging application 250 may provide the instructions to the receiving computing device and receive response data indicating a response to communication. The messaging application 250 may include a response analyzer 285. The messaging application 250 may include a response analyzer 285 that is configured to analyze the received response data and generate additional response data based on the received response data. The response analyzer 285 may be implemented by the one or more processors 210 and may be similar to the response analyzer 146 of FIG. 1. The response analyzer 285 may compare the received response data to the instructions and any included images. In some instances, the received response data may not include the images. Instead, the received response data includes a reference to the images. For example, the received response data may include a reference to a particular image. The response analyzer 285 may determine that the reference to the particular image corresponds to the candidate response "pizza" of the particular image. The response analyzer 285 may generate the additional response data that includes the text "pizza." The response analyzer 285 may provide the additional response data to the computing device that provided the original communication.

In some implementations, the received response data may include audio data of the user verbally selecting an option presented by the computing device according to the instructions. In this case, the response analyzer 285 may access a speech recognizer 280. The messaging application 250 may include the speech recognizer 280, and the one or more processors 210 may implement the speech recognizer 280. The speech recognizer 280 may be configured to generate a transcription of the audio by using the speech recognition models 235. The speech recognizer 280 may provide the transcription of the audio to the response analyzer 285, and the response analyzer 285 may compare the transcription to the candidate responses. If the response analyzer 285 determines that the transcription is similar to one of the candidate responses, then the response analyzer 285 may generate the additional response data that includes the text that matches the candidate response. If the response analyzer 285 determines that the transcription is not similar to one of the candidate responses, then the response analyzer 285 may generate the additional response data that includes the transcription of the audio. In some implementations, the response analyzer 285 may include the audio in the additional response data.

The messaging application 250 may continue to manage the exchange of communications data between the computing devices and other computing devices. The model trainer 290 may update the response generation rules 230 and retrain the response generation models 225 based on the response selected by the user presented with the candidate responses. The model trainer 290 may generate additional data samples of training data based on the recent portions of the communications. The model trainer 290 may retrain the response generation models 225 using the additional data samples and the previously generated data samples. If the model trainer 290 identifies additional patterns, then the model trainer 290 may update the response generation rules 230. The candidate response generator 255 may use the updated response generation rules 230 and response generation models 225 to select candidate responses to subsequent communications.

Figure 3:
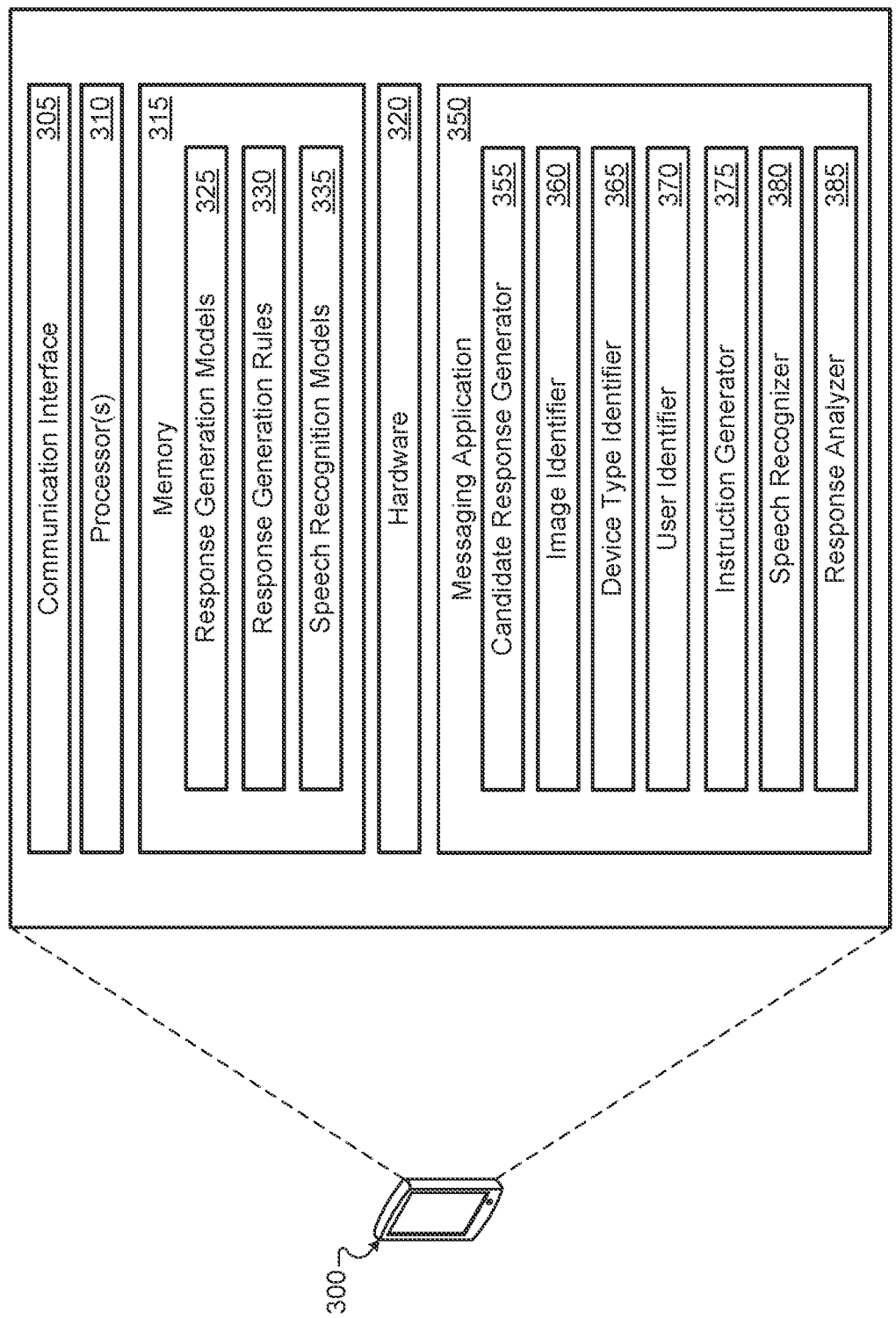
FIGS. 3 and 4 illustrate example computing devices that are configured to allow a user to interact with a messaging application using menu-based communication.

FIG. 3 illustrates an example computing device 300 that is configured to allow a user to interact with a messaging application using menu-based communication. The computing device 300 may be any type of device that is configured to communicate with other computing devices. The computing device 300 may interact with a wireless carrier network. The computing device 300 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The computing device 300 may be similar to the computing devices 104 and/or 108 of FIG. 1. Some of the components of the computing device 300 may be implemented in a single computing device or distributed over multiple computing devices. Some of the components may be in the form of virtual machines or software containers that are hosted in a cloud in communication with disaggregated storage devices. The description related to the computing device 300 may describe how the computing device 300 operates when the computing device 300 receives a communication inputted by a user and transmits instructions to a receiving computing device for how to display the communication.

The computing device 300 may have the functionality described below in instances where a server does not perform one or more of the functions illustrated in FIG. 1. For example, the computing device 300 may include a candidate response generator 355 that generates candidate responses for a communication received by the computing device 300. In this case, the computing device 300 may be communicating with a server that does not include a candidate response generator, and the server provides the candidate responses received from the computing device 300 to a receiving computing device.

The computing device 300 may include a communication interface 305, one or more processors 310, memory 315, and hardware 320. The communication interface 305 may include communication components that enable the computing device 300 to transmit data and receive data from devices connected to the wireless carrier network. The communication interface 305 may include an interface that is configured to communicate with base stations of a wireless carrier network. The communication interface 305 may receive data that other devices transmit to the base stations and/or transmit data to the base stations for transmission to the other devices. In some implementations, the communication interface 305 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a messaging application 350. The messaging application 350 may be similar to the messaging application 110, 116, and/or 140 of FIG. 1. The messaging application 350 may be configured to configured to conduct text-based conversations with other users. In some instances, the messaging application 350 may be configured to facilitate the exchange of images, videos, and audio clips between computing devices. In some instances, the messaging application 350 may facilitate the exchange of short messaging service communications and/or multimedia messaging service communications with between computing devices. In some instances, the messaging application 350 may be configured to perform speech recognition on the speech audio received from a computing device. The message application 350 may transmit a transcription of the audio to a receiving computing device and include or not include the audio.

The messaging application 350 may include a candidate response generator 355. The candidate response generator 355 may be similar to the candidate response generator 118 of FIG. 1 and may be implemented by the one or more processors 310. The candidate response generator 355 may be configured to analyze a communication and determine candidate responses to the communication. The communication may be inputted into the computing device 300 by a user as part of a conversation with a receiving user who is operating another receiving computing device.

The candidate response generator 355 may use various factors to determine the candidate responses to the communication. For example, the candidate response generator 355 may analyze the location of the computing device 300 and the receiving computing device, the device type of the computing device 300 and the receiving computing device, an identity of the users of the computing device 300 and the receiving computing device, previous communications between the user and the receiving user, and/or any other similar factors. The candidate response generator 355 may analyze the factors using the response generation models 325 and/or the response generation rules 330 that specify candidate responses to the communication based on the various factors. For example, the candidate response generator 355 may determine not to generate candidate responses to the communication. As another example, the candidate response generator 355 may determine textual candidate responses to the communication. As another example, the candidate response generator 355 may determine images that are candidate response to the communication. As another example, the candidate response generator 355 may determine audio or video clips that are candidate response to the communication.

The messaging application 350 may include a device type identifier 365. The device type identifier 365 may be similar to the device type identifier 120 of FIG. 1 and may be implemented by the one or more processors 310. The device type identifier 365 may be configured to identify the type of device of the computing device 300. The device type identifier 365 may access data stored in the memory 315 that indicates the type or model of the computing device 300. The device type identifier 365 may also be configured to determine a type of device of the receiving computing device that will be receiving the communication. The device type identifier 365 may request and receive the device type data from a server. In some implementations, the device type identifier 365 may store or have access to device type data for each contact in the contacts data accessible by the computing device 300. The device type identifier 365 may receive the device type data from a server and/or a user of the computing device 300. The device type identifier 365 may provide data identifying the device types of the computing devices to the candidate response generator 355.

The messaging application 350 may include a user identifier 370. The device user identifier 370 may be similar to the user identifier 122 of FIG. 1 and may be implemented by the one or more processors 310. The user identifier 370 may be configured to determine the identity of the user of the computing device 300 and/or the identity of the receiving user of the receiving computing device. The user identifier 370 may provide the identity data to the candidate response generator 255. The user identifier 370 may be configured to access data stored in the memory 315 that indicates an identity of the user of the computing device 300. The user identifier 370 may also be configured to determine an identity of the receiving user of the receiving computing device based on data requested and/or received from a server. In some implementations, the user identifier 370 may store or have access to identity data for each contact in the contacts data accessible by the computing device 300. The user identifier 370 may receive the identity data from a server and/or a user of the computing device 300. The user identifier 370 may provide identity data for the user of the computing device 300 and/or identity data for the receiving user of the receiving computing device to the candidate response generator 355.

In some instances, the identity data can include demographic data of the user and/or the receiving user. The user identifier 370 may provide identity data and/or demographic data to the candidate response generator 355 based on the user data associated with the computing device 300 and/or the receiving computing device. In some instances, the user identifier 370 may provide data classifying the users. For example, the user identifier 370 may provide an age range of the users to the candidate response generator 355. In some implementations, the user identifier 370 may provide data indicating whether the computing devices are included in the same account with the wireless carrier, as may be the case for the computing devices of each person who are part of the same household.

The candidate response generator 355 may receive the device type data from the device type identifier 365 and the identity data from the user identifier 370. Based on the device type data and the identity data, the candidate response generator 355 may access location data and previous communication data. The candidate response generator 355 may access location data from a GPS receiver included in the hardware 320. In some implementations, the candidate response generator 355 may receive location data of the receiving computing device from a server. The candidate response generator 355 may access previous communication data. The previous communication data may be related to previous conversations that the user of the computing device 300 had with the user of the receiving computing device and other users. The previous communication data may be stored in the memory 315 and/or on a server and accessible by the candidate response generator 355.

The candidate response generator 355 may generate the candidate responses using the response generation models 325 and/or the response generation rules 330 to analyze the communication and any additional data. The computing device 300 may receive the response generation models 325 and/or the response generation rules 330 from a server. The server may train the response generation models 325 and generate the response generation rules 330. The response generation models 325 may be configured to receive the communication, the locations of the computing device 300 and the receiving computing device, the device type of the computing device 300 and the receiving computing device, an identity of the users of the computing device 300 and the receiving computing device, previous communications between the user and the receiving user, and/or any other similar factors. The response generation models 325 may output candidate responses to the communication. The response generation rules 330 may be configured to specify how to compare the communication, the locations of the computing device 300 and the receiving computing device, the device type of the computing device 300 and the receiving computing device, an identity of the users of the computing device 300 and the receiving computing device, previous communications between the user and the receiving user, and/or any other similar factors. The response generation rules 330 may output candidate responses to the communication.

In some implementations, the candidate response generator 118 may present the candidate responses to the user of the computing device 300. The user may select which candidate responses to provide to the receiving user. In some implementations, the computing device 300 may provide data indicating which candidate responses the user selected to the server. The server may use the selection data to retrain the response generation models and/or update the response generation rules. The server may provide the retrained response generation models and/or the updated response generation rules to the computing device 300.

The candidate response generator 355 may provide the candidate responses to the instruction generator 375. The messaging application 350 may include the instruction generator 375 and the one or more processors 310 may implement the instruction generator 375. The instruction generator 375 may be similar to the instruction generator 132 of FIG. 1. The instruction generator 375 may be configured to determine an appropriate technique to use to display the communication and the candidate responses on a receiving computing device. The instruction generator 375 may also be configured to generate instructions for the receiving computing device for how to display the communication and the candidate responses. The instruction generator 375 may analyze the communication, the candidate responses, the device type data, the identity data, the previous communication data, and/or the location data to determine how to display the communication and the candidate responses. The instruction generator 375 may use one or more rules that specify how to compare the communication, the candidate responses, the device type data, the identity data, the previous communication data, and/or the location data to determine the display technique. For example, a rule may specify to display images for the candidate responses when the user is under the age of eight. Another rule may specify to display images for the candidate responses when the computing device has a screen that is smaller than three inches. Another rule may specify to make the candidate responses selectable when displaying images on the computing device.

The instruction generator 375 may access an image identifier 360 to identify images for the candidate responses. The image identifier 360 may be included in the messaging application 350 and may be implemented by the one or more processors 310. The image identifier 360 may be similar to the image identifier 130 of FIG. 1. The image identifier 360 may be configured to perform an image search for each of the candidate responses to identify an image that represents the candidate response. In some instances, the image identifier 360 may submit the text of the candidate response to a search engine. The image identifier 360 may select the top image that the search engine identified. In some implementations, the image identifier 360 may store image data of previously used or common images and the corresponding responses. In this case, the image identifier 360 may determine if the image identifier 360 has an image that corresponds to the candidate response before accessing the search engine.

The messaging application 350 may provide the instructions to the server for providing to the receiving computing device. The receiving user may provide a response to the communication. In some instances, the response may be an image that corresponded to one of the candidate responses. The messaging application 350 may include a response analyzer 385. The messaging application 350 may include a response analyzer 385 that is configured to analyze the received response data and output data on a display of the computing device 300 indicating the selected candidate response. The response analyzer 385 may be implemented by the one or more processors 310 and may be similar to the response analyzer 146 of FIG. 1. The response analyzer 385 may compare the received response data to the instructions and any included images. In some instances, the received response data may not include the images. Instead, the received response data includes a reference to the images. For example, the received response data may include a reference to a particular image. The response analyzer 385 may determine that the reference to the particular image corresponds to the candidate response "pizza" of the particular image. The response analyzer 385 may generate the additional response data that includes the text "pizza." The response analyzer 385 may provide the additional response data to the computing device that provided the original communication.

In some implementations, the received response data may include audio data of the user verbally selecting an option presented by the computing device according to the instructions. In this case, the response analyzer 385 may access a speech recognizer 380. The messaging application 350 may include the speech recognizer 380, and the one or more processors 310 may implement the speech recognizer 380. The speech recognizer 380 may be configured to generate a transcription of the audio by using the speech recognition models 335. The speech recognizer 380 may provide the transcription of the audio to the response analyzer 385, and the response analyzer 385 may compare the transcription to the candidate responses. If the response analyzer 385 determines that the transcription is similar to one of the candidate responses, then the response analyzer 385 may generate the additional response data that includes the text that matches the candidate response. If the response analyzer 385 determines that the transcription is not similar to one of the candidate responses, then the response analyzer 385 may generate the additional response data that includes the transcription of the audio. In some implementations, the response analyzer 385 may include the audio in the additional response data.

The messaging application 350 may continue to receive communications from the user of the computing device 300 and from the receiving computing device. The computing device 300 may receive updated response generation rules and retrained response generation models from a server. The candidate response generator 355 may use the updated response generation rules and retrained response generation models to generate candidate responses for subsequent portions of the conversation and future conversations and provide those candidate responses to the server for the server to provide to a receiving computing device.

Figure 4:
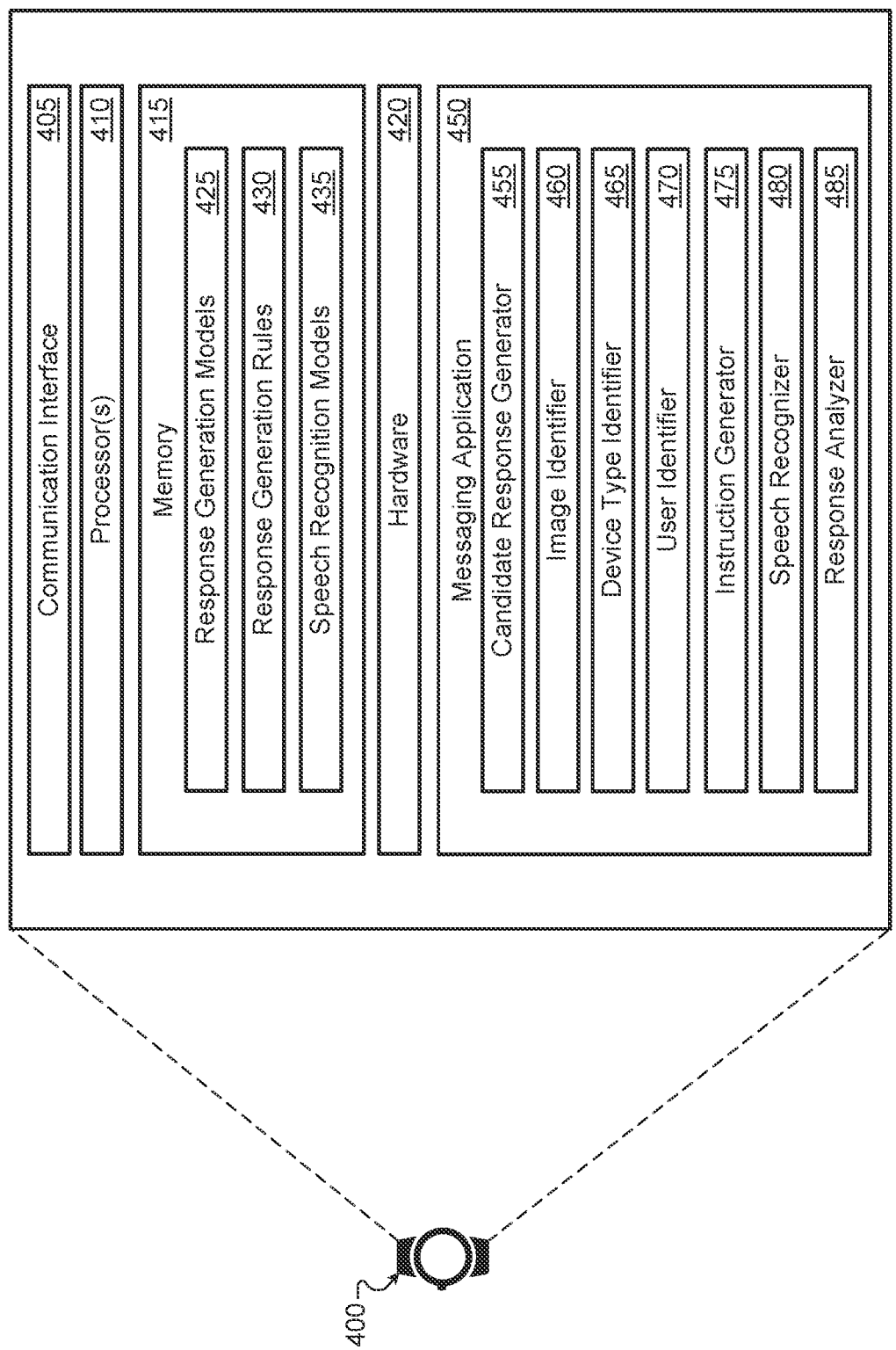

FIG. 4 illustrates an example computing device 400 that is configured to allow a user to interact with a messaging application using menu-based communication. The computing device 400 may be any type of device that is configured to communicate with other computing devices. The computing device 400 may interact with a wireless carrier network. The computing device 400 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The computing device 400 may be similar to the computing devices 104 and/or 108 of FIG. 1. Some of the components of the computing device 400 may be implemented in a single computing device or distributed over multiple computing devices. Some of the components may be in the form of virtual machines or software containers that are hosted in a cloud in communication with disaggregated storage devices. The description related to the computing device 400 may describe how the computing device 400 operates when the computing device 400 receives a communication from a server and the computing device 400 determines how to display the communication. The server may receive the communication from a sending computing device.

The computing device 400 may have the functionality described below in instances where a server does not perform one or more of the functions illustrated in FIG. 1. For example, the computing device 400 may include a candidate response generator 455 that generates candidate responses for a communication received by the computing device 400 from the server. In this case, the server with which the computing device 400 is communicating does not include a candidate response generator. The computing device 400 receives a communication from the server, generates the candidate responses, and presents the communication and the candidate responses to a user of the computing device 400. The computing device 400 outputs data indicating the response to the server for sending to the computing device that sent the communication.

The computing device 400 may include a communication interface 405, one or more processors 410, memory 415, and hardware 420. The communication interface 405 may include communication components that enable the computing device 400 to transmit data and receive data from devices connected to the wireless carrier network. The communication interface 405 may include an interface that is configured to communicate with base stations of a wireless carrier network. The communication interface 405 may receive data that other devices transmit to the base stations and/or transmit data to the base stations for transmission to the other devices. In some implementations, the communication interface 405 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 420 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 415 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 410 may implement a messaging application 450. The messaging application 450 may be similar to the messaging application 110, 116, and/or 140 of FIG. 1. The messaging application 450 may be configured to configured to conduct text-based conversations with other users. In some instances, the messaging application 450 may be configured to facilitate the exchange of images, videos, and audio clips between computing devices. In some instances, the messaging application 450 may facilitate the exchange of short messaging service communications and/or multimedia messaging service communications with between computing devices. In some instances, the messaging application 450 may be configured to perform speech recognition on the speech audio received from a computing device. The message application 450 may transmit a transcription of the audio to a receiving computing device and include or not include the audio.

The messaging application 450 may include a candidate response generator 455. The candidate response generator 455 may be similar to the candidate response generator 118 of FIG. 1 and may be implemented by the one or more processors 410. The candidate response generator 455 may be configured to analyze a communication and determine candidate responses to the communication. The communication may be received from a server. The server may receive the communication from a sending computing device and a user who inputted the communication in the sending computing device. For example, the sending computing device may transmit a short messaging service message to the server. The server may transmit that short messaging service message to the computing device 400.

The candidate response generator 455 may use various factors to determine the candidate responses to the communication. For example, the candidate response generator 455 may analyze the location of the computing device 400 and the sending computing device, the device type of the computing device 400 and the sending computing device, an identity of the users of the computing device 400 and the sending computing device, previous communications between the user and the sending user, and/or any other similar factors. The candidate response generator 455 may analyze the factors using the response generation models 425 and/or the response generation rules 430 that specify candidate responses to the communication based on the various factors. For example, the candidate response generator 455 may determine not to generate candidate responses to the communication. As another example, the candidate response generator 455 may determine textual candidate responses to the communication. As another example, the candidate response generator 455 may determine images that are candidate response to the communication. As another example, the candidate response generator 455 may determine audio or video clips that are candidate response to the communication.

The messaging application 450 may include a device type identifier 465. The device type identifier 465 may be similar to the device type identifier 120 of FIG. 1 and may be implemented by the one or more processors 410. The device type identifier 465 may be configured to identify the type of device of the computing device 400. The device type identifier 465 may access data stored in the memory 415 that indicates the type or model of the computing device 400. The device type identifier 465 may also be configured to determine a type of device of the sending computing device. The device type identifier 465 may request and receive the device type data of the sending computing device from a server. In some implementations, the device type identifier 465 may store or have access to device type data for each contact in the contacts data accessible by the computing device 400. The device type identifier 465 may receive the device type data from a server and/or a user of the computing device 400. The device type identifier 465 may provide data identifying the device types of the computing devices to the candidate response generator 455.

The messaging application 450 may include a user identifier 470. The device user identifier 470 may be similar to the user identifier 122 of FIG. 1 and may be implemented by the one or more processors 410. The user identifier 470 may be configured to determine the identity of the user of the computing device 400 and/or the identity of the sending user of the sending computing device. The user identifier 470 may provide the identity data to the candidate response generator 455. The user identifier 470 may be configured to access data stored in the memory 415 that indicates an identity of the user of the computing device 400. The user identifier 470 may also be configured to determine an identity of the sending user of the sending computing device based on data requested and/or received from a server. In some implementations, the user identifier 470 may store or have access to identity data for each contact in the contacts data accessible by the computing device 400. The user identifier 470 may receive the identity data from a server and/or a user of the computing device 400. The user identifier 470 may provide identity data for the user of the computing device 400 and/or identity data for the sending user of the sending computing device to the candidate response generator 455.

In some instances, the identity data can include demographic data of the user and/or the receiving user. The user identifier 470 may provide identity data and/or demographic data to the candidate response generator 455 based on the user data associated with the computing device 400 and/or the sending computing device. In some instances, the user identifier 470 may provide data classifying the users. For example, the user identifier 470 may provide an age range of the users to the candidate response generator 455. In some implementations, the user identifier 470 may provide data indicating whether the computing devices are included in the same account with the wireless carrier, as may be the case for the computing devices of each person who are part of the same household.

The candidate response generator 455 may receive the device type data from the device type identifier 465 and the identity data from the user identifier 470. Based on the device type data and the identity data, the candidate response generator 455 may access location data and previous communication data. The candidate response generator 455 may access location data from a GPS receiver included in the hardware 420. In some implementations, the candidate response generator 455 may receive location data of the sending computing device from a server. The candidate response generator 455 may access previous communication data. The previous communication data may be related to previous conversations that the user of the computing device 400 had with the user of the sending computing device and other users. The previous communication data may be stored in the memory 415 and/or on a server and accessible by the candidate response generator 455.

The candidate response generator 455 may generate the candidate responses using the response generation models 425 and/or the response generation rules 430 to analyze the communication and any additional data. The computing device 400 may receive the response generation models 425 and/or the response generation rules 430 from a server. The server may train the response generation models 425 and generate the response generation rules 430. The response generation models 425 may be configured to receive the communication, the locations of the computing device 400 and the sending computing device, the device type of the computing device 400 and the sending computing device, an identity of the users of the computing device 400 and the sending computing device, previous communications between the user and the sending user, and/or any other similar factors. The response generation models 425 may output candidate responses to the communication. The response generation rules 430 may be configured to specify how to compare the communication, the locations of the computing device 400 and the sending computing device, the device type of the computing device 400 and the sending computing device, an identity of the users of the computing device 400 and the sending computing device, previous communications between the user and the sending user, and/or any other similar factors. The response generation rules 430 may output candidate responses to the communication.

The candidate response generator 455 may provide the candidate responses to the instruction generator 475. The messaging application 450 may include the instruction generator 475 and the one or more processors 410 may implement the instruction generator 475. The instruction generator 475 may be similar to the instruction generator 132 of FIG. 1. The instruction generator 475 may be configured to determine an appropriate technique to use to display the communication and the candidate responses on the computing device 400. The instruction generator 475 may analyze the communication, the candidate responses, the device type data, the identity data, the previous communication data, and/or the location data to determine how to display the communication and the candidate responses. The instruction generator 475 may use one or more rules that specify how to compare the communication, the candidate responses, the device type data, the identity data, the previous communication data, and/or the location data to determine the display technique. For example, a rule may specify to display images for the candidate responses when the user is under the age of eight. Another rule may specify to display images for the candidate responses when the computing device 400 has a screen that is smaller than three inches. Another rule may specify to make the candidate responses selectable when displaying images on the computing device 400.

The instruction generator 475 may access an image identifier 460 to identify images for the candidate responses. The image identifier 460 may be included in the messaging application 450 and may be implemented by the one or more processors 410. The image identifier 460 may be similar to the image identifier 130 of FIG. 1. The image identifier 460 may be configured to perform an image search for each of the candidate responses to identify an image that represents the candidate response. In some instances, the image identifier 460 may submit the text of the candidate response to a search engine. The image identifier 460 may select the top image that the search engine identified. In some implementations, the image identifier 460 may store image data of previously used or common images and the corresponding responses. In this case, the image identifier 460 may determine if the image identifier 460 has an image that corresponds to the candidate response before accessing the search engine.

The messaging application 450 may implement the instructions and output the communication and candidate responses on the computing device 400. For example, the messaging application 450 may output the communication and candidate responses on a display of the computing device 400. The computing device 400 may receive a response to the communication from the user of the computing device 400 interacting with the communication and candidate responses and/or candidate responses. In some instances, the response may be a selection of an image that corresponds to one of the candidate responses. The messaging application 450 may include a response analyzer 485 that is configured to analyze the response and output response data indicating the selected candidate response. The response analyzer 485 may be implemented by the one or more processors 410 and may be similar to the response analyzer 146 of FIG. 1. The response analyzer 485 may compare the response to the instructions and any included images. In some instances, the response may not include a selection of an image. Instead, the response may include a reference to the images. For example, the response may include a reference to a particular image. The response analyzer 485 may determine that the reference to the particular image corresponds to the candidate response "pizza" of the particular image. The response analyzer 485 may generate the response data that includes the text "pizza." The response analyzer 485 may provide the response data to the server that provided the original communication.

In some implementations, the response received from the user may include audio data of the user verbally selecting an option presented by the computing device according to the instructions. In this case, the response analyzer 485 may access a speech recognizer 480. The messaging application 450 may include the speech recognizer 480, and the one or more processors 410 may implement the speech recognizer 480. The speech recognizer 480 may be configured to generate a transcription of the audio by using the speech recognition models 435. The speech recognizer 480 may provide the transcription of the audio to the response analyzer 485, and the response analyzer 485 may compare the transcription to the candidate responses. If the response analyzer 485 determines that the transcription is similar to one of the candidate responses, then the response analyzer 485 may generate the response data that includes the text that matches the candidate response. If the response analyzer 485 determines that the transcription is not similar to one of the candidate responses, then the response analyzer 485 may generate the response data that includes the transcription of the audio. In some implementations, the response analyzer 485 may include the audio in the additional response data.

The messaging application 450 may continue to receive communications from the server and from the sending computing device. The computing device 400 may receive updated response generation rules and retrained response generation models from a server. The candidate response generator 455 may use the updated response generation rules and retrained response generation models to generate candidate responses for subsequent portions of the conversation and future conversations.

Figure 5:
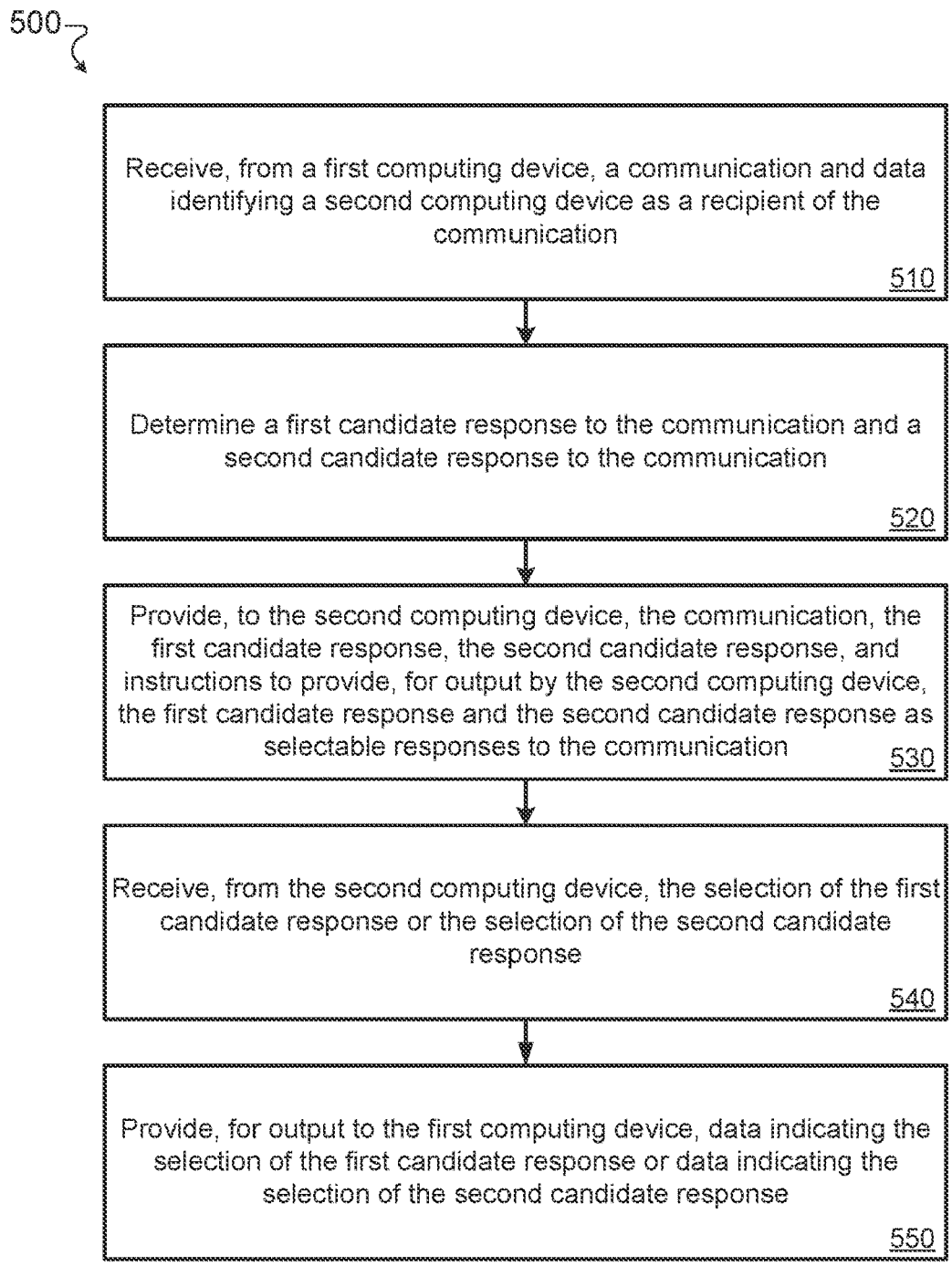
FIG. 5 is a flowchart of an example process for providing menu-based communication between users through a messaging application.

FIG. 5 is a flowchart of an example process 500 for providing menu-based communication between users through a messaging application. In general, the process 500 receives a communication from a first computing device 104 to a second computing device 108 and generates candidate responses to the communication. The process 500 determines how the second computing device 108 should present the communication and the candidate responses. The process 500 instructs the second computing device 108 how to present the communication and the candidate responses. The process 500 receives a response from the second computing device 108 and provides data indicating that response to the first computing device 104. The process 500 will be described as being performed by the server 106 of FIG. 1 and will include references to other components in FIG. 1. In some implementations, the process 500 may be performed by one or more of the server 200 of FIG. 2, computing device 300 of FIG. 3, and/or computing device 400 of FIG. 4.

The server 106 receives, from the first computing device 104, a communication 114 and data identifying a second computing device 108 as a recipient of the communication 114 (510). In some implementations, the communication 114 may be in the form of a text message. In some implementations, the communication 114 may include media content such as audio of speech of the user 102, an image, a video, and/or any other similar data. In some implementations, the first computing device 104 may be configured to transcribe speech audio of the user 102. The communication 114 may include the speech audio and/or the transcription. In some implementations, the server 106 may be configured to transcribe speech audio included in the communication 114.

The server 106 determines a first candidate response to the communication and a second candidate response to the communication 114 (520). The server 106 may use various factors to determine the first and second candidate responses to the communication 114. In some implementations, the server 106 may determine device type data that indicates a type of computing device of the first computing device 104 and/or the second computing device 108. In some implementations, the server 106 may determine user identity data that indicates an identity of the user 102 of the first computing device 104 and/or the user 103 of the second computing device 108. In some implementations, the server 106 may determine or access historical data that includes data related to previous communications between the user 102 and the user 103 and between the users 102 and 103 and other users. In some implementations, the server 106 may determine location data that indicates the location of the first computing device 104 and/or the second computing device 108.

In some implementations, the server 106 analyzes the communication 114, the device type data, the user identity data, the historical data, and/or the location data using one or more response generation rules and/or response generation models. The response generation rules and/or response generation models may be configured to determine the first and second candidate responses to the communication 114 based on the communication 114, the device type data, the user identity data, the historical data, and/or the location data.

In some implementations, the server 106 identifies a first image that represents the first candidate response and a second image that represents the second candidate response. In some implementations, the server 106 may request that the user 102 of the first computing device 104 review the first candidate response, the second candidate response, and/or the corresponding images. The user 102 may approve the first candidate response, the second candidate response, and/or the corresponding images. The user 102 may reject some of the first candidate response, the second candidate response, and/or the corresponding images. In this case, the server 106 may identify additional candidate responses and/or corresponding images. The additional candidate responses and/or corresponding images may be ones that had a confidence score that was below a threshold or were ranked lower than the first or second candidate responses. In some implementations, the user 102 may provide the first candidate response, the second candidate response, and/or the corresponding images to the first computing device 104.

The server 106 provides, to the second computing device 108, the communication, the first candidate response, the second candidate response, and instructions to provide, for output by the second computing device 108, the first candidate response and the second candidate response as selectable responses to the communication (530). In some implementations, the instructions may specify to display the first and second candidate responses as selectable options on a screen of the second computing device 108. In this case, the user 103 may be able to touch or interact with either of the selectable options to respond to the communication 114. In some implementations, the instructions may specify to display the first image and the second image as selectable options on a screen of the second computing device 108. In this case, the user 103 may be able to touch or interact with either of the images to respond to the communication 114. In some implementations, the user 103 may speak to respond to the communication instead or in addition to selecting a selectable option. In some implementations, the instructions may indicate to provide audio of the communication 114. The audio may include speech of the user 102 and/or synthesized speech.

The server 106 receives, from the second computing device 108, the selection of the first candidate response or the selection of the second candidate response (540). The server 106 may receive the selection of the first candidate response or the selection of the second candidate response in various forms. In some instances, the server 106 may receive data identifying a selected image. In this case, the server 106 may determine to which candidate response the data identifying the selected image corresponds. In some instances, the server 106 may receive speech audio from the user 103. In this case, the server 106 may perform speech recognition on the speech audio. The server 106 may determine to which candidate response the transcription of the speech audio corresponds.

The server 106 provides, for output to the first computing device 104, data indicating the selection of the first candidate response or data indicating the selection of the second candidate response (550). The data indicating the selection may include text of the first or second candidate responses. In some implementations, the server 106 may determine the format of the selection of the first candidate response or the selection of the second candidate response. For example, the format may be a selection of an image and/or speech audio. In this case, the server 106 may provide, to the first computing device 104, the speech audio and/or the selected image. In some implementations, the server 106 may determine the format of the communication 114. For example, the communication 114 may be a text message. In this case, the server 106 may provide a text-based response based on the response from the second computing device 108 independent of whether the response was speech audio, an image, and/or text.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:
1. A computer-implemented method, comprising:
receiving, from a first computing device, a communication and data identifying a second computing device as a recipient of the communication;
determining an age of a user of the second computing device;
determining a first textual candidate response to the communication and a second textual candidate response to the communication;
based on the age of the user of the second computing device, determining to identify images that correspond to the first textual candidate response and the second textual candidate response;
in response to determining to identify images that correspond to the first textual candidate response and the second textual candidate response, selecting a first image that includes a representation of a subject matter of the first textual candidate response;

in response to determining to identify images that correspond to the first textual candidate response and the second textual candidate response, selecting a second image that includes a representation of a subject matter of the second textual candidate response;

providing, to the second computing device, the communication, the first image, the second image, and instructions to provide, for output by the second computing device, the first image and the second image as selectable responses to the communication;

receiving, from the second computing device, a selection of the first image or a selection of the second image; and providing, for output to the first computing device, the first textual candidate response as data indicating the selection of the first image or the second textual candidate response as data indicating the selection of the second image.

2. The method of claim 1,
wherein providing the communication, the first image, the second image, and the instructions to provide, for output by the second computing device, the first image and the second image as selectable responses to the communication comprises providing the first image, the second image, and instructions to provide, for output by the second computing device on a display of the second computing device, the first image and the second image.

3. The method of claim 2, wherein the instructions to provide, for output by the second computing device on the display of the second computing device, the first image and the second image comprise:
instructions to provide, for output, the first image as a first selectable button and the second image as a second selectable button.

4. The method of claim 1, wherein receiving the selection of the first image or the selection of the second image comprises:
receiving audio data indicating the selection of the first image or audio data indicating the selection of the second image.

5. The method of claim 1, wherein determining the first textual candidate response to the communication and the second textual candidate response to the communication comprises:
receiving, from the first computing device, the first textual candidate response and the second textual candidate response.

6. The method of claim 1, wherein determining the first textual candidate response to the communication and the second textual candidate response to the communication comprises:
analyzing the communication; and
based on analyzing the communication, generating the first textual candidate response and the second textual candidate response.

7. The method of claim 1, comprising:
determining a type of computing device of the second computing device,
wherein determining the first textual candidate response to the communication and the second textual candidate response to the communication is based on the type of computing device of the second computing device.

8. The method of claim 1, comprising:
determining a first format of the selection of the first image or the selection of the second image,
wherein providing the first textual candidate response as the data indicating the selection of the first image or the second textual candidate response as the data indicating the selection of the second image comprises generating additional data indicating the selection of the first image or additional data indicating the selection of the second image in a second format that is similar to the first format.

9. The method of claim 1,
wherein determining the first textual candidate response to the communication and the second textual candidate response to the communication is based on the user of the second computing device.

10. The method of claim 1, wherein determining the first textual candidate response to the communication and the second textual candidate response to the communication comprises:
analyzing previous communications between a user of the first computing device and the user of the second computing device; and
based on analyzing the previous communications between the user of the first computing device and the user of the second computing device, generating the first textual candidate response and the second textual candidate response.

11. A system, comprising:
one or more processors; and
memory including a plurality of computer-executable components that are executable by the one or more processors to perform a plurality of actions, the plurality of actions comprising:
receiving, from a first computing device, a communication and data identifying a second computing device as a recipient of the communication;
determining an age of a user of the second computing device;
determining a first textual candidate response to the communication and a second textual candidate response to the communication;
based on the age of the user of the second computing device, determining to identify images that correspond to the first textual candidate response and the second textual candidate response;
in response to determining to identify images that correspond to the first textual candidate response and the second textual candidate response, selecting a first image that includes a representation of a subject matter of the first textual candidate response;
in response to determining to identify images that correspond to the first textual candidate response and the second textual candidate response, selecting a second image that includes a representation of a subject matter of the second textual candidate response;
providing, to the second computing device, the communication, the first image, the second image, and instructions to provide, for output by the second computing device, the first image and the second image as selectable responses to the communication;
receiving, from the second computing device, a selection of the first image or a selection of the second image; and
providing, for output to the first computing device, the first textual candidate response as data indicating the selection of the first image or the second textual candidate response as data indicating the selection of the second image.

12. The system of claim 11, wherein the plurality of actions comprise:
wherein providing the communication, the first image, the second image, and the instructions to provide, for output by the second computing device, the first image and the second image as selectable responses to the communication comprises providing the first image, the second image, and instructions to provide, for output by the second computing device on a display of the second computing device, the first image and the second image.

13. The system of claim 11, wherein receiving the selection of the first image or the selection of the second image comprises:
receiving audio data indicating the selection of the first image or audio data indicating the selection of the second image.

14. The system of claim 11, wherein determining the first textual candidate response to the communication and the second textual candidate response to the communication comprises:
receiving, from the first computing device, the first textual candidate response and the second textual candidate response.

15. The system of claim 11, wherein determining the first textual candidate response to the communication and the second textual candidate response to the communication comprises:
analyzing the communication; and
based on analyzing the communication, generating the first textual candidate response and the second textual candidate response.

16. The system of claim 11, wherein the plurality of actions comprise:
determining a type of computing device of the second computing device,
wherein determining the first textual candidate response to the communication and the second textual candidate response to the communication is based on the type of computing device of the second computing device.

17. The system of claim 11, wherein the plurality of actions comprise:
determining a first format of the selection of the first image or the selection of the second image,
wherein providing the first textual candidate response as the data indicating the selection of the first image or the second textual candidate response as the data indicating the selection of the second image comprises generating additional data indicating the selection of the first image or additional data indicating the selection of the second image in a second format that is similar to the first format.

18. The system of claim 11,
wherein determining the first textual candidate response to the communication and the second textual candidate response to the communication is based on the user of the second computing device.

19. The system of claim 11, wherein determining the first textual candidate response to the communication and the second textual candidate response to the communication comprises:
analyzing previous communications between a user of the first computing device and the user of the second computing device; and
based on analyzing the previous communications between the user of the first computing device and the user of the second computing device, generating the first textual candidate response and the second textual candidate response.

20. One or more non-transitory computer-readable media of a computing device storing computer-executable instructions that upon execution cause one or more computers to perform acts comprising:
receiving, from a first computing device, a communication and data identifying a second computing device as a recipient of the communication;
determining an age of a user of the second computing device;
determining a first textual candidate response to the communication and a second textual candidate response to the communication;
based on the age of the user of the second computing device, determining to identify images that correspond to the first textual candidate response and the second textual candidate response;
in response to determining to identify images that correspond to the first textual candidate response and the second textual candidate response, selecting a first image that includes a representation of a subject matter of the first textual candidate response;
in response to determining to identify images that correspond to the first textual candidate response and the second textual candidate response, selecting a second image that includes a representation of a subject matter of the second textual candidate response;
providing, to the second computing device, the communication, the first image, the second image, and instructions to provide, for output by the second computing device, the first image and the second image as selectable responses to the communication;
receiving, from the second computing device, a selection of the first image or a selection of the second image; and
providing, for output to the first computing device, the first textual candidate response as data indicating the selection of the first image or the second textual candidate response as data indicating the selection of the second image.

* * * * *